United States Patent [19]

Nicholson et al.

[11] Patent Number: 5,365,510
[45] Date of Patent: Nov. 15, 1994

[54] COMMUNICATIONS SYSTEM WITH A SINGLE PROTECTION LOOP

[75] Inventors: David J. Nicholson; Donald R. Ellis, both of Ottawa; John B. Mills; Dino C. DiPerna, both of Kanata; David W. Martin, Nepean; Wang-Hsin Peng, Ottawa; Kim B. Roberts, Kanata, all of Canada

[73] Assignee: Northern Telecom Limited, Montreal, Canada

[21] Appl. No.: 865,533

[22] Filed: Apr. 9, 1992

[51] Int. Cl.⁵ .............................................. H04L 1/22
[52] U.S. Cl. ...................................... 370/16; 371/8.2; 371/11.2
[58] Field of Search ................. 370/16, 16.1, 13, 13.1; 371/8.1, 8.2, 11.1, 11.2

[56] References Cited

U.S. PATENT DOCUMENTS 4,393,493 7/1983 Edwards ................................ 370/16
4,646,286 2/1987 Reid et al. ............................ 370/16
4,680,776 7/1987 Ikeuchi et al. ....................... 370/16

*Primary Examiner*—Wellington Chin
*Attorney, Agent, or Firm*—Dallas F. Smith

[57] ABSTRACT

A communications system is provided having SONET communications channels extending between first and second locations. The channels include pairs of forward and reverse channels for carrying traffic in normal operation between first and second locations and a protection channel for carrying traffic of one channel in the event of a fault. Each pair of forward and reverse channels is provided on a shelf at each location, the shelves having the same relative position at both locations and the protection channel is provided on a protection shelf. The protection channel includes, between the first and second locations, a forward optical link and a reverse optical link and at each of the first and second locations, a single protection loop, coupling the forward and reverse optical links, that forms the protection channel. The protection loop is used to provide, at each location, a local virtual protection loop for indicating the protection requirements and status of the respective location, and a remote virtual protection loop for indicating the protection requirements and status of the location remote from the respective location. The local protection loop is provided by inserting K1 and K2 bytes into E1 slots of STS-1 #25 and #2, respectively. The remote protection loop is provided by inserting K1 and K2 bytes into E1 slots of STS-1 #26 and #3, respectively.

11 Claims, 7 Drawing Sheets

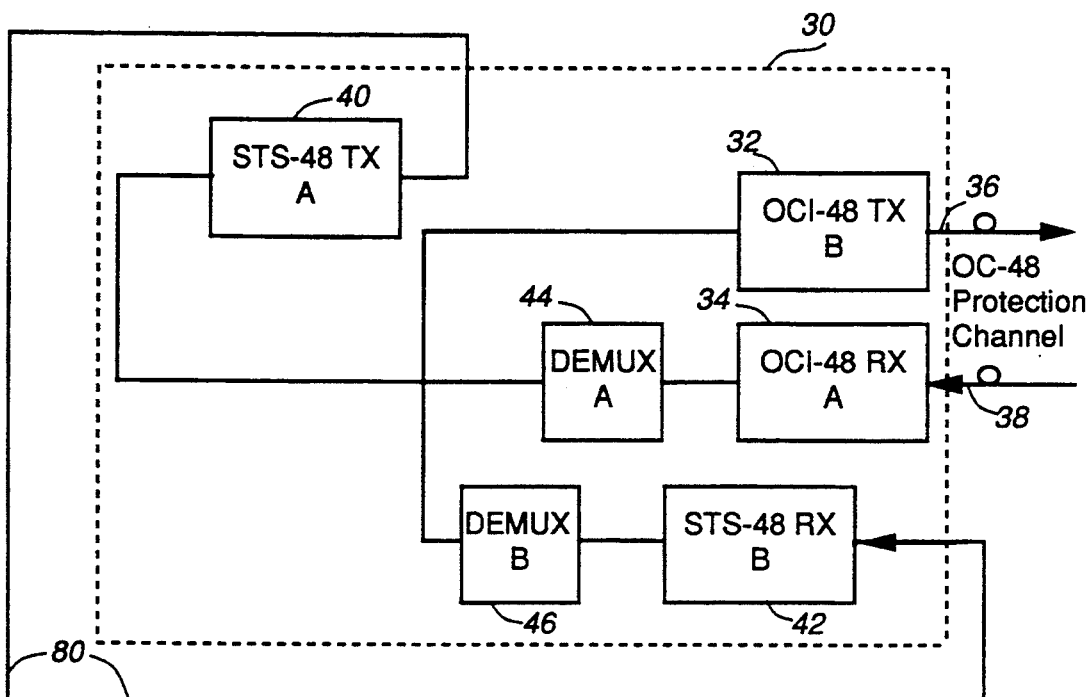
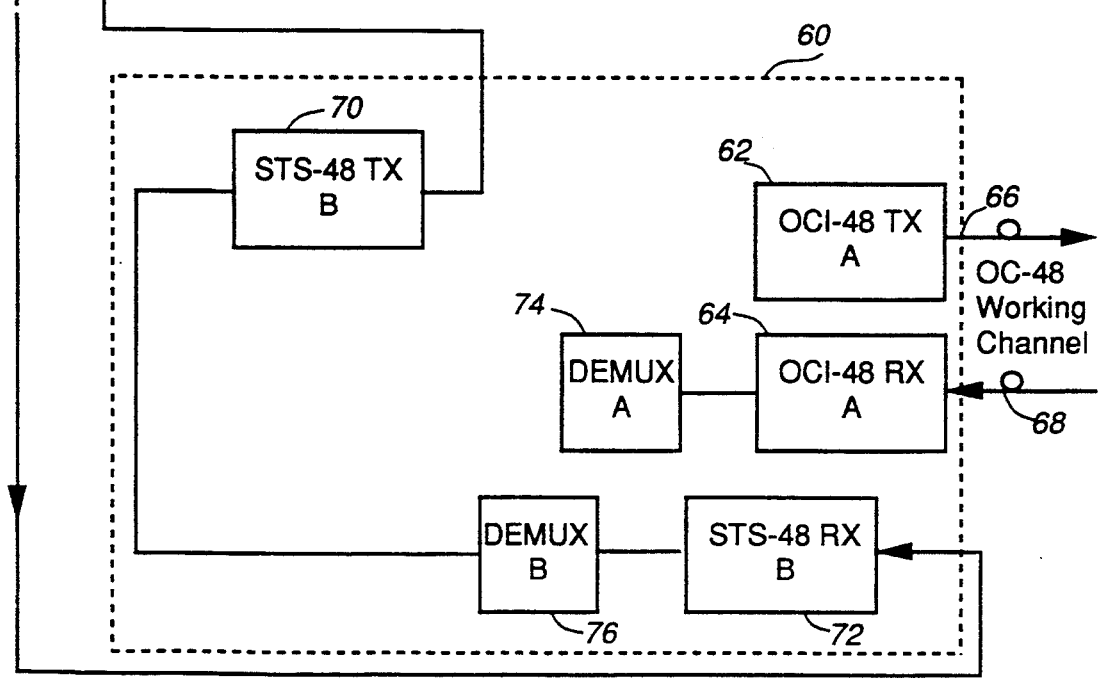
Fig. 2

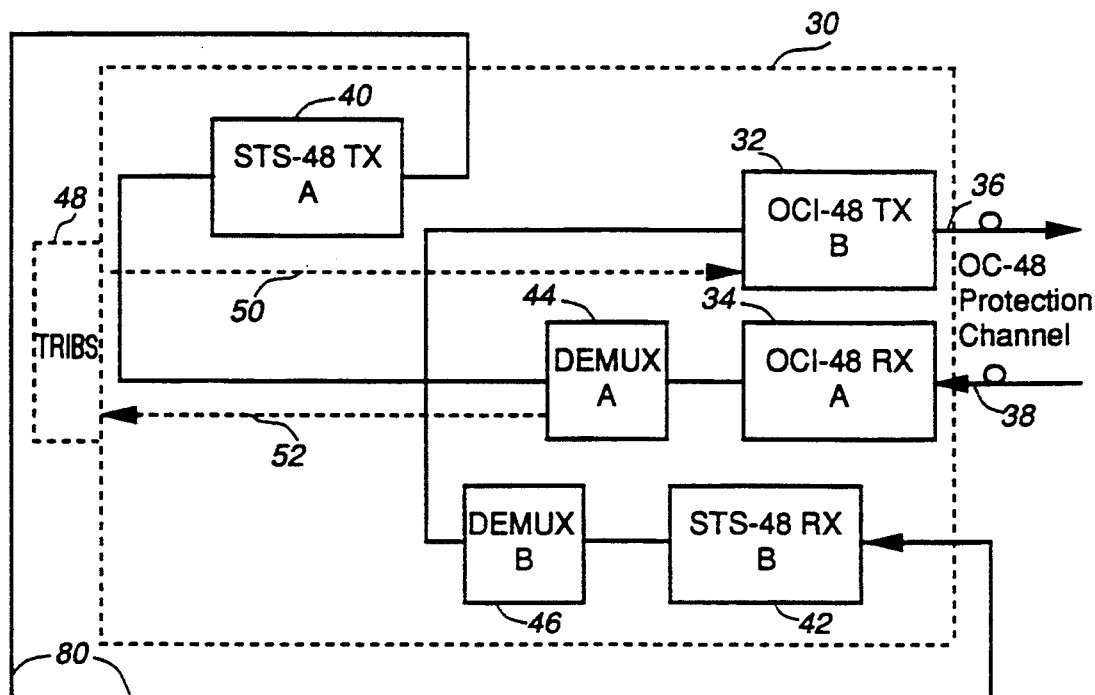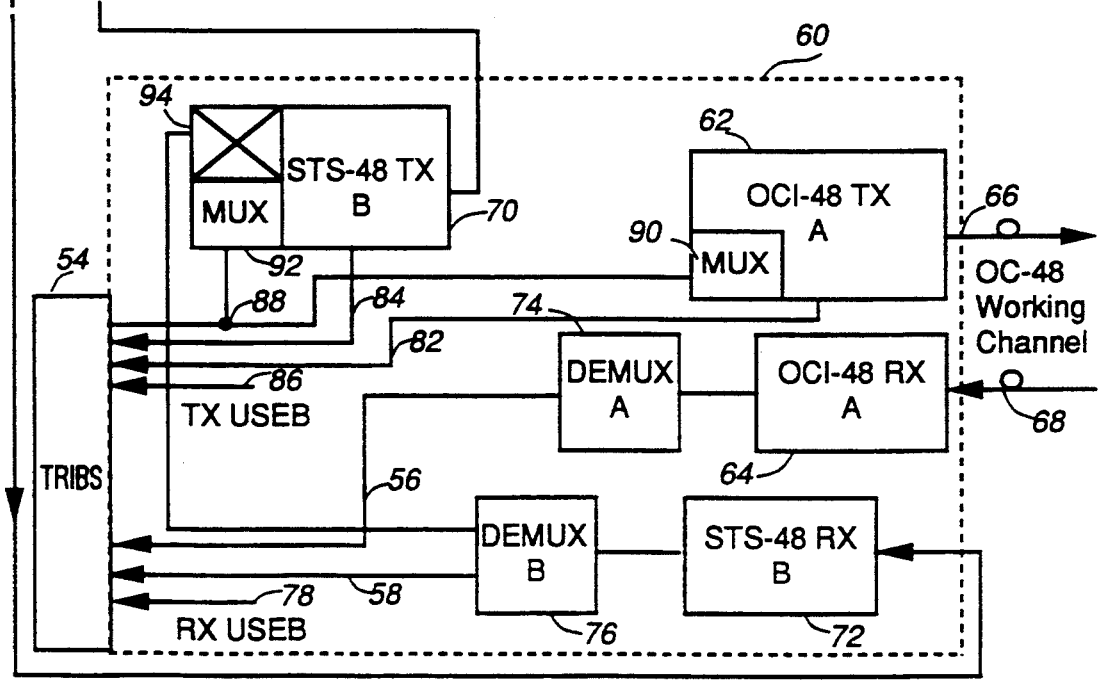
Fig. 3

COMMUNICATIONS SYSTEM WITH A SINGLE PROTECTION LOOP

This invention relates to optical communications systems, and is particularly concerned with providing a protection channel for so-called protection switching.

BACKGROUND OF THE INVENTION

It is known to provide a plurality of communications channels, for example optical fiber transmission channels on which digital signals are transmitted in time division multiplexed frames, between different locations. In order to maintain transmission in the event of a fault on one of the channels, it is also known to provide a so-called protection channel via which the traffic of a faulty channel is transmitted. The routing of traffic from a faulty channel onto the protection channel is referred to as protection switching.

The SONET (Synchronous Optical Network) standard (ANSI T1.105 and Bellcore TA-TSY-000253) defines a physical interface, optical line rates known as Optical Carrier (OC) signals, a frame format, and an OAM&P protocol. The OC signals have electrical equivalents call Synchronous Transport Signals (STS). A base rate of 51.84 Mbit/s (OC-1/STS-1) is defined, with higher rates being integer multiples of the base rate. SONET also defines requirements for protection switching, a hierarchy of failure conditions to be used and a signalling scheme. The signalling uses Automatic Protection Switching (APS) bytes within the line overhead (LOH) of the SONET frame.

It is desirable to provide an optical communications system that takes advantage of the inherent efficiency of the SONET standard with respect to the use of automatic protection switching (APS) bytes defined therein for APS signalling. It is also desirable to provide a protection switching arrangement that reduces the duplication of hardware required for implementation.

SUMMARY OF THE INVENTION

An object of the present invention is to provide an improved communications system with a single protection loop.

In accordance with one aspect of the present invention there is provided in a communications system comprising SONET communications channels extending between first and second locations, the channels comprising a plurality of forward and reverse channels for carrying traffic in normal operation between first and second locations and a protection channel for carrying traffic of one channel in the event of a fault, each pair of the plurality of forward and reverse channels is provided on a shelf at each location, the shelves having the same relative position at both locations and the protection channel is provided on a protection shelf, the protection channel including, between the first and second locations, a forward optical link and a reverse optical link and at each of the first and second locations, a single protection loop, coupling the forward and reverse optical links, that forms the protection channel, a method comprising the steps of providing, at each location, a local virtual protection loop for indicating the protection requirements and status of the respective location, and providing, at each location, a remote virtual protection loop for indicating the protection requirements and status of the location remote from the respective location.

In accordance with another aspect of the present invention there is provided a communications system comprising SONET communications channels extending between first and second locations, the channels comprising a plurality of forward and reverse channels for carrying traffic in normal operation between first and second locations and a protection channel for carrying traffic of one channel in the event of a fault on said one channel, the protection channel including, between the first and second locations, a forward optical link and a reverse optical link and at each of the first and second locations, a single protection loop, coupling the forward and reverse optical links, that forms the protection channel.

An advantage of the present invention is by using a single protection loop, a reduction in equipment is achieved over either dual loop or bus arrangements. A further advantage is achieved by using standard formats for the signalling used to implement virtual protection loops, in that the same hardware is used for both the protection loop and the normal communications channels. This reduces the number of different circuit cards required thus allowing reductions in spacing. An advantage in using virtual protection loops is that separate circuitry between shelves is not required to provide the switching status and request information.

BRIEF DESCRIPTION OF THE DRAWINGS

The present invention will be further understood from the following description with reference to the drawings in which:

FIG. 2 illustrates a block diagram of a communications system in accordance with an embodiment of the present invention;

FIG. 3 illustrates detail of the protection and working shelves of the system of FIG. 2;

Similar references are used in different figures to denote similar components.

By the nature of the SONET standard STS and OC signals are interchangeable. Thus, reference herein to one or the other are in respect to the specific embodiment described and it is to be understood that one skilled in the art would recognize that those elements designated as OC could as easily be STS and vice versa.

DETAILED DESCRIPTION

Figure 1:
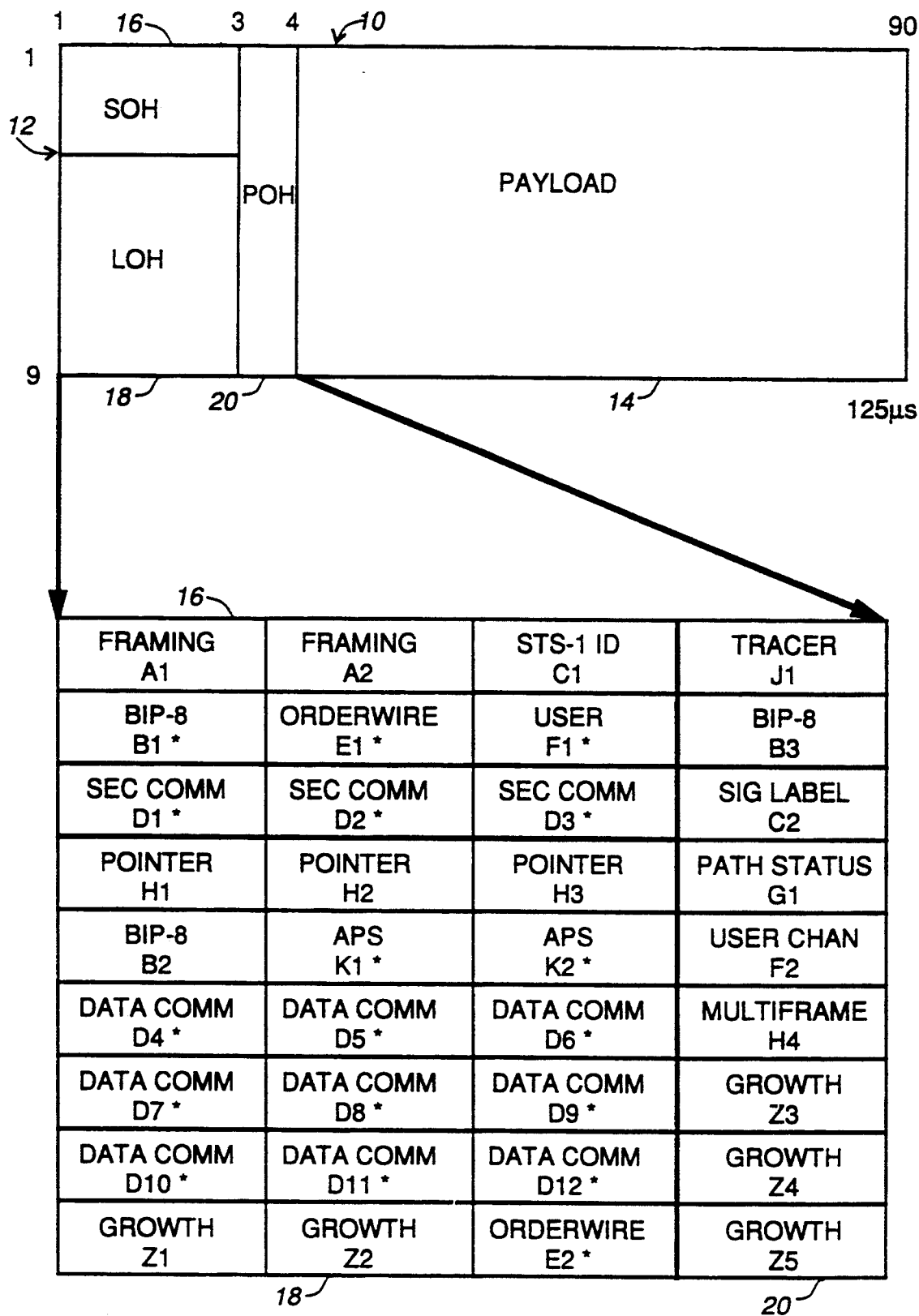
FIG. 1 illustrates a known SONET frame format.

Referring to FIG. 1, there is illustrated the frame format of the SONET standard. The frame 10 is defined as 90 bytes by 9 bytes and includes a transport overhead (TOH) 12, of 3 bytes by 9 bytes and a payload 14, of 87 bytes by 9 bytes. The TOH 12 is further subdivided into a section overhead (SOH) 16, of 3 bytes by 3 bytes and a line overhead (LOH) 18, of 3 bytes by 6 bytes. The first column of nine bytes in the payload 14 forms the path overhead (POH) 20. Each overhead byte has an assigned purpose and label as shown in the expanded view in FIG. 1. For example the first and second bytes are for framing and are labelled A1 and A2. The fifth and sixth bytes of the LOH are the APS bytes K1 and K2 of STS-1 #1. The K1 byte is used to indicate requests. The K2 byte is used primarily to indicate status.

The defined values of the K1 Byte are given in the SONET standard. Bits 1–3 are used to indicate the protection condition. Bit 4 is used for priority for automatic requests only. Bits 5–8 contain the channel number of the channel asserting the protection condition.

If channel number 0 is selected then the condition bits show the protection channel status. If channel 15 is selected then the condition bits show the priority assigned to extra traffic.

Reverse request is used in a bi-directional switching mode to request the switch in the reverse direction. Reverse request is implicitly prioritized at the level of the request it is acknowledging.

The defined values of the K2 Byte are given in the SONET standard. Bits 1–4 are used to indicate the channel number of the traffic carried on the P-Channel. Bit 5 is used to indicate a 1:N or 1+1 protection scheme. Bits 6–8 have several defined and yet to be defined uses.

States other than '111' and '110' for bits 6–8 are not defined in the current version of TA-TSY-000253. The two states listed as Request Blocked and Protection State Change are anticipated for use in nested span switching. All other states are reserved for future use.

Thus, it is well known to provide communications systems with protection loops. For example Reid et al., in U.S. Pat. No. 4,646,286, issued Feb. 24, 1987 to Northern Telecom Limited, teach separate protection paths, at each location, for the transmit and receive paths.

Referring to FIG. 2, there is illustrated, in a functional block diagram, a site level view of a 1:N terminal configuration for an optical communications system in accordance with an embodiment of the present invention. Each terminal includes a protection shelf 30. Each protection shelf 30 includes transmit and receive units, 32 and 34, respectively, coupled to optical fibers 36 and 38, respectively. Each protection shelf 30 also includes a redundant set of transmit and receive units, 40 and 42, respectively. Each terminal includes N working shelves 60 (represented by a single shelf in FIG. 2). Each working shelf 60 includes transmit and receive units 62 and 64, respectively, coupled to optical fibers 66 and 68, respectively. Each working shelf 60 also includes a redundant set of transmit and receive units 70 and 72, respectively. For simplicity, connection of lines from demultiplex units and to transmit units are not shown in FIG. 2.

On working shelves 60, an A set of units, consisting of the transmit A unit 62, the receive A unit 64, and a DEMUX A unit 74, is provided to support optical communication on an optical channel via optical fibers 66 and 68. A second set of units, the B set, consisting of the transmit B unit 70, the receive B unit 72, and a DEMUX B unit 76, is provided to support a protection loop (P-Loop) 80.

The protection shelf 30, also has A and B sets of units. The A set of units consist of the transmit A unit 40, the receive A unit 34, and a DEMUX A unit 44. The receive unit 34 is coupled to the optical fiber 38. The DEMUX A unit 44 couples the receive unit A 34 to the transmit A unit 40. The transmit A unit 40 is coupled to the P-Loop 80. The B set of units consist of the transmit B unit 32, the receive B unit 42, and a DEMUX B unit The receive B unit 42 is coupled to the DEMUX B unit 46. The DEMUX B unit 46 couples the receive B unit 42 to the transmit B unit 32. The transmit B unit 32 is coupled to the optical fiber 36.

One embodiment of the P-loop 80 is a high-speed (2.488 Gbit/s) coaxial loop that is an extension of the P-channel optical line. The P-loop 80 originates on the protection shelf 30 and is routed down to the last working channel shelf 60 of the terminal. From there it propagates through each working shelf 60 via the B set of units back to the protection shelf.

In operation, each working shelf 60 can either accept traffic from the P-loop 80 and bridge its own traffic onto the P-loop 80 or pass-through the existing traffic on the P-loop 80.

Typically, in the event of a fault affecting it, a working shelf 60, at the head end of a span, bridges its traffic onto the P-loop 80. Each other working shelf 60 on the P-loop 80 between the bridged shelf and the protection shelf 30 passes the traffic through its B set of units 72,76, and 70. The protection shelf 30 passes this traffic out on the P-channel. At the tail end of the span, the traffic is routed via the P-loop down from the protection shelf to the terminal's last working channel shelf and then passed back up through each working channel shelf until reaching the working channel shelf that asserted the request.

Referring to FIG. 3, there is illustrated a more detailed functional block diagram of the protection and working shelves 30 and 60 of FIG. 2. A block 48, shown in broken line, labelled TRIBS (tributaries) represents optional low priority channels that may be coupled to the protection shelf 30. The TRIBS 48 provide data to the transmit B unit 32 via a bus 50 and receive data from the DEMUX A unit 44 via the bus 52. When the protection channel is needed for protection switching of one of the working shelves 60, the low priority data from the TRIBS 48 is dropped. The implementation of the optional tributaries is similar to that for the working shelf 60, which is described in detail below For extra traffic, the payload must be terminated on DEMUX A unit 44 of a protection shelf 30. This ensures that extra traffic can be supported during a P-loop failure or during site expansion (i.e. adding a new working channel shelf).

A block 54, labelled TRIBS (tributaries) represents channels coupled to the working shelf 60. The DEMUX units 74 and 76 provide received clocks, frame and data to the TRIBS 54, via busses 56 and 58, respectively. A line 78, labelled RX USEB provides an enable signal that informs the TRIBS 54 which of the receive lines to use. Similarly, the transmit units 62 and 70 provide transmit clocks and frame to the TRIBS 54 via lines 82 and 84, respectively. A line labelled TX USEB 86 provides an enable signal that informs the TRIBS 54 which of the transmit clocks and frame to use. The TRIBS 54 is coupled to the transmit units 62 and 70 via a bus 88. The transmit unit 62 includes a MUX 90 coupled to the bus 88 for multiplexing the data thereon for transmission via the optical fiber 66. The transmit unit 70 includes a MUX 92 coupled to the bus 88 and a switch 94 having inputs coupled to the P-loop 80 and to the MUX 92 and an output coupled to the P-loop 80.

In operation, the TRIBS 54 transmit and receive data via the optical channel provided by the transmit unit 62 and the optical fiber 66, and the optical fiber 68, the receive unit 64, and the DEMUX A unit 74. Data to be transmitted is provided to both transmit units 62 and 70.

However, the switch 94 in the transmit unit 70 is switched to connect the P-loop 80 at its input to the P-loop 80 at its output, thereby providing a pass-through for the data on the P-loop 80. Thus, data from the TRIBS 54 to the transmit unit 70 is blocked. In this case, the enable signal on the TX USEB line 86 in not provided, that is a do not use transmit unit B condition exists.

On the receive side, data received via the optical fiber 68 by the receive unit 64 is demultiplexed by the DEMUX A unit 74 and provided to the TRIBS 54 via the bus 56. In this case, the enable signal on the RX USEB line 78 is not provided. Thereby, the TRIBS 54 are informed to accept the data on the bus 56. Thus, the B set of units merely form part of the P-loop by providing a path for data to pass through the shelf.

When a fault occurs on the working channel, the data from the TRIBS 54 is switched to the protection channel. How such switching is accomplished is the subject of U.S. Pat. No. 4,646,286 mentioned above and the Bellcore standard TA-TSY-000253 and as such is not repeated here. Once switched, the TRIBS 54 use the B set of units for both transmitting and receiving data. When the protection channel is used, the switch 94 in the transmit B unit 70 is coupled to the MUX 92 thereby providing the data from the TRIBS 54 to the P-loop 80. In this case, the TX USEB line 86 provides an enable signal. The receive B unit 72 receives data from the P-loop 80 and supplies the data to the DEMUX B unit 76. The DEMUX B unit 46 has two output ports, one (not demultiplexed) for passing the P-loop data on to the transmit B unit, the other for providing demultiplexed data, together with receive clocks and frame to the TRIBS 54 via the bus 58. In this case, the RX USEB line carries an enable signal. Thus, the TRIBS 54 accept the receive clocks, frame and data from the DEMUX B unit 76.

Figure 4:
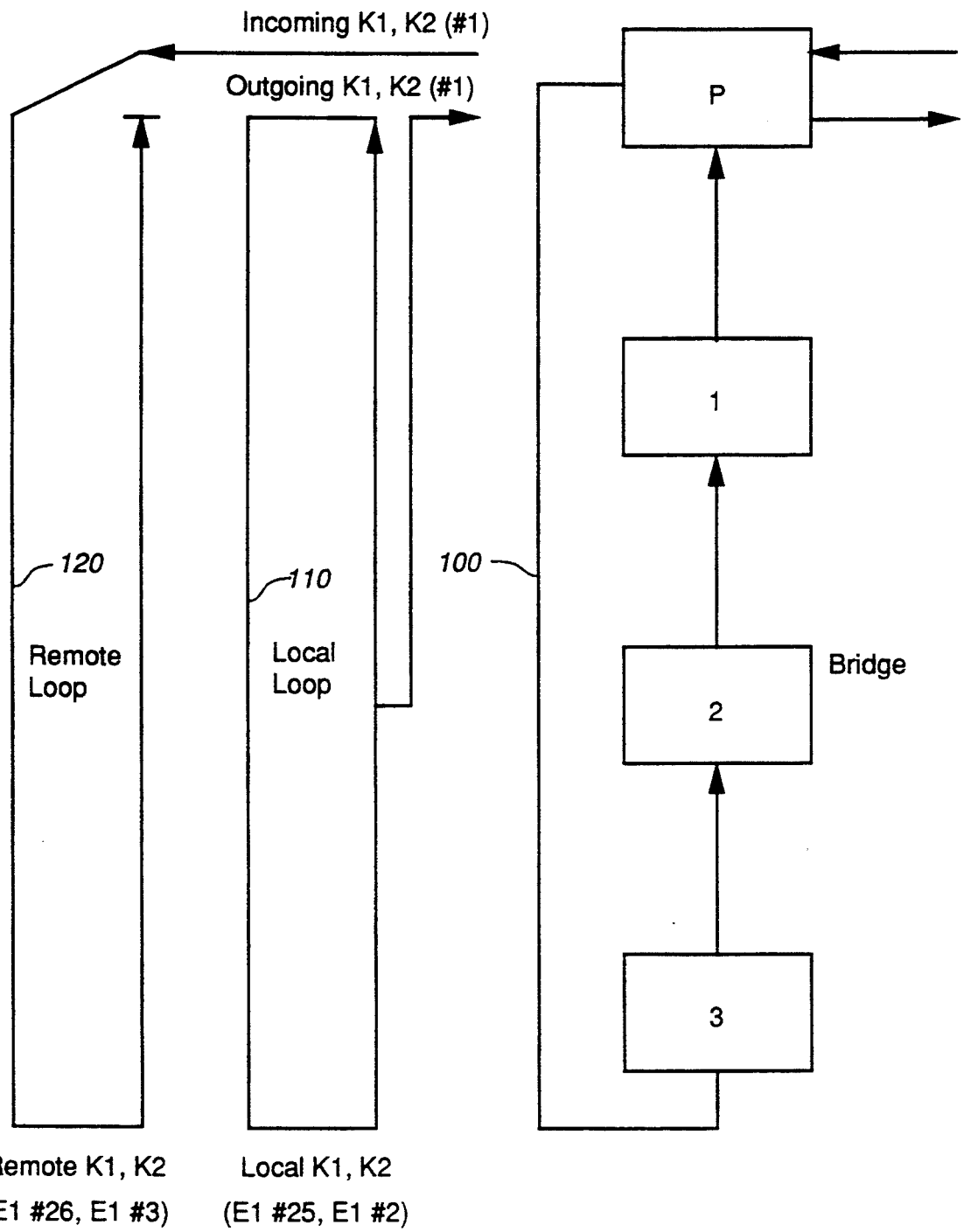
FIGS. 4a, 4b, and 4c, illustrates the protection loops in accordance with the present invention.

Referring to FIGS. 4a, 4b, and 4c there is illustrated the P-loop in its physical, virtual (local and remote) forms. The single physical loop 100 of FIG. 4a carries the APS bytes K1 and K2 of STS-1 #1 used for APS signalling in accordance with the SONET standard. Within the terminal site, two virtual loops are established as represented by FIGS. 4b and 4c. A local virtual loop 110, FIG. 4b, is established by providing local K1 and K2 bytes in the E1 slot of STS-1 #25 and #2, respectively. A remote virtual loop 120, FIG. 4c, is established by providing remote K1 and K2 bytes in the E1 slot of STS-1 #26 and #3, respectively.

In operation, the APS bytes (K1, K2) support all the necessary inter-site and inter-shelf protection switching control. The P-loop consists of a single physical loop 100 that supports two virtual APS byte loops within it. A local APS byte loop 110 carries the K1 and K2 bytes generated at the local site. The K1 byte uses the E1 (LOW) slot in the SOH of STS-1 #25. The K2 byte uses the E1 slot in the SOH of STS-1 #2. A remote APS byte loop 120 carries the K1 and K2 bytes received from the remote site. The K1 byte uses the E1 slot in the SOH of STS-1 #26. The K2 byte uses the E1 slot in the SOH of STS-1 #3. The K-bytes in the local and remote APS byte virtual loops never leave the P-loop of the terminal site. The E1 slots are always overwritten by the transport overhead multiplexer on the P-channel shelf OCI-48TX B unit. Thus, no site outside the P-loop will receive these virtual bytes.

By using slots in the SOH, a shelf can assert a request (e.g. place a local K1 byte onto the P-loop) without altering the line BIP-8 of an STS-1, thus avoiding a Line BIP-8 re-calculation. The section BIP-8 is always calculated for the outgoing STS-48.

Figure 5:
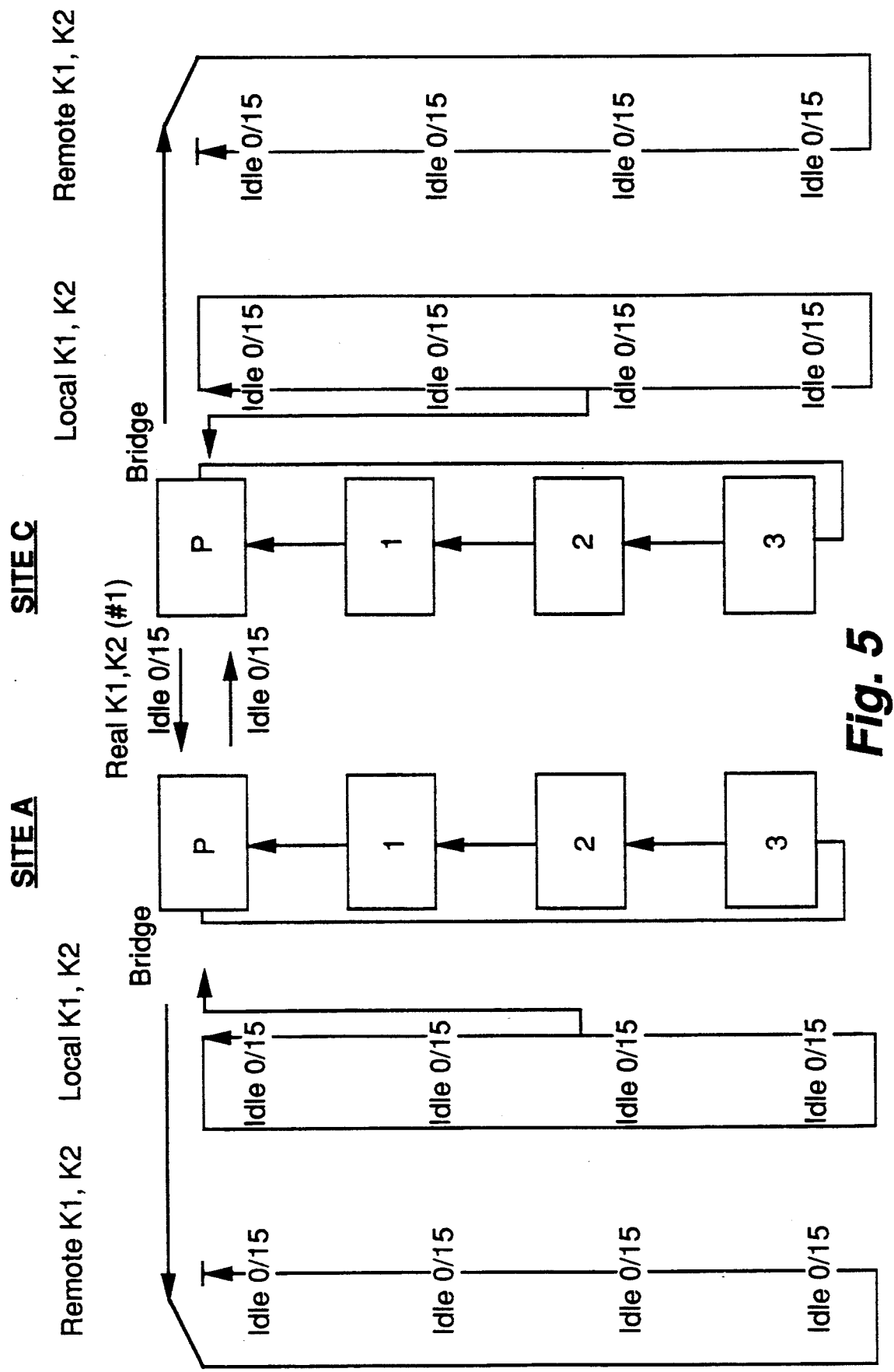
FIG. 5 illustrates the protection loops of FIG. 4 with the system in an idle state.
Figure 6:
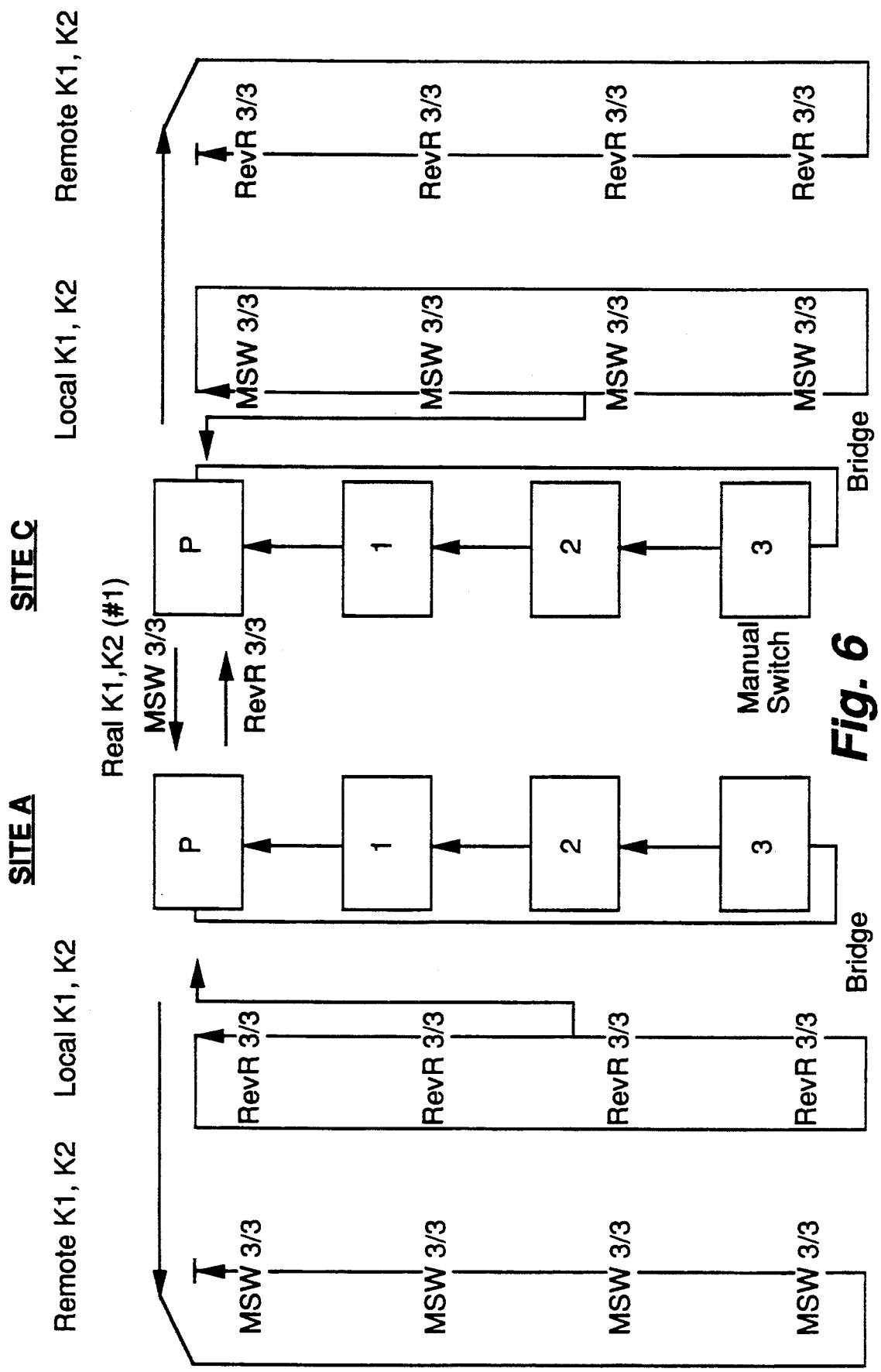
FIG. 6 illustrates the protection loops of FIG. 4 with the system in a manual switched state.

These virtual loops ensure that each shelf is given a complete set of information (Local and Remote K bytes) upon which to base its protection decisions. In order to differentiate the K bytes in the virtual APS byte loops from the true K bytes of STS-1 #1, the true K-bytes are referred to hereinbelow as the real K bytes Referring to FIGS. 5 and 6 examples are provided of the inter-shelf routing of the APS bytes. FIG. 5 illustrates a terminal-terminal 1:3 system under idle conditions (channel P is assumed to be idly bridged) and FIG. 6 illustrates a bi-directional Manual switch in effect. Both the local and remote APS byte loops are shown a each terminal site.

The inter-shelf routing rules are as follows:

a) Remote APS byte loop, The P-channel shelf copies the incoming K1 and K2 bytes from slots within STS-1 #1 to the E1 slot in STS-1 #26 and the E1 slot in STS-1 #3, respectively. Recall that the incoming line is always; passed through to the P-loop, thus all shelves are capable of extracting the received K-bytes from the E1 slots on the P-loop. A bridged working channel must relay the Remote K-bytes across the bridge. A working channel in pass-through must pass the remote K1, K2 bytes.

b) Local APS byte loop. A bridged working channel must set the local K2 byte, bits 1–4 equal to its own channel number, as it is now the source of the traffic on the P-loop (only when actively bridged). Relay the local K1 byte value across the bridge if the priority of that request is higher than its own or replace the local K1 byte with its own request if the reverse is true. Copy both local K-bytes into real K-bytes timeslots. Note that this also applies to a bridged P-channel for the Demux B to OCI-48TX B path (i.e. outgoing optical line).

A working channel in pass-through must relay local K2 byte, however, it must be capable of replacing the current Local K1 byte with its own, if its request is higher in priority. Otherwise, the current local K1 byte is also passed through. This also applies to a P-channel in pass-through for the Demux B to OCI-48TX B path.

The P-channel completes the local APS bytes loop by relaying the local K bytes back onto the P-loop. When a shelf is in pass-through the received SOH and LOH are passed through untouched (i.e. transparent pass-through mode). When a shelf wishes to insert a request (i.e. K1 byte in the local loop), it must change to the non-transparent pass-through mode (NTP). In the NTP mode, the LOH is still passed through untouched but the virtual K bytes in the SOH can be overwritten.

Figure 7:
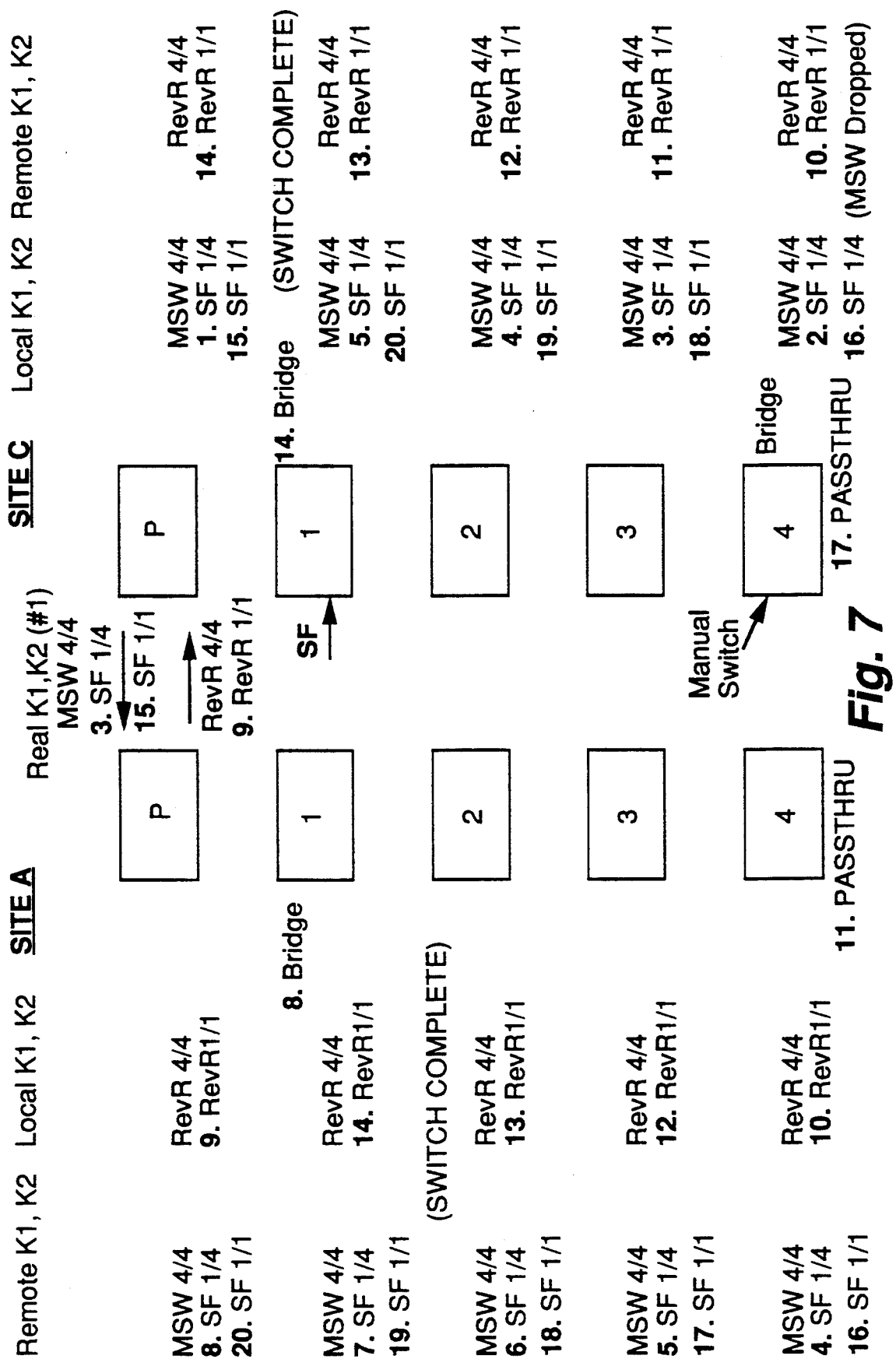
FIG. 7 illustrates the protection loops of FIG. 4 with the system responding to a request to be protection switched.

Referring to FIG. 7, there is illustrated the APS byte signalling sequence in the event of an SF switch request at site C, Channel 1 with an existing Manual Switch in effect on Channel 4.

At site C, the switching span's tail end, the SF condition is detected by demux A and subsequently communicated to the microcontroller on demux B. The microcontroller on demux B determines that this SF is the highest priority switch request and consequently, initiates the following protection switching sequence.

Step 1: Channel 1 asserts the SF request in the outgoing K1 byte (local APS byte loop), however the K2 byte still shows a CHID of 4 because Channel 4 is the channel currently bridging traffic onto the P-loop at site C;

Steps 2-5, site C: the SF request propagates around the local APS byte loop so that all shelves, above and below the requesting shelf are aware of the condition;

Steps 3-7, site A: the request propagates up through the span's head end via the remote APS byte loop;

Step 8: the span's head end detects the request and consequently bridges its traffic onto the P-loop. Assertion of the TX USEB control is held off (tentatively 3 ms) to allow the B OCI-48TX unit to phase lock to the OCI-TX A unit. At this time, site A, Channel 1 also asserts a Reverse Request since it is provisioned for bi-directional switching.

Step 9: the outgoing real K2 byte from site A contains a CHID of 1;

Note that via the remote APS byte loop, all shelves at site A, above and below the bridging channel are aware of the far end's request.

Step 10: Channel 4 at site A detects a CHIDMM and thus releases its switch (Channel 4 being aware of the SF request does not assert a Switch Fail condition). It also determines that the local SF request has been honoured since it detects a CHID of 1 in the remote K2 byte. Consequently, this channel must release its bridged state after Channel 1 has bridged, that is when CHID=1 appears in the local K2 byte, to allow the traffic to reach the requesting channel on the P-loop.

Steps 11-13: the reverse request and remote CHID reaches the span's tail end.

Step 14: at site C, Channel 1 must bridge in response to the Reverse Request and also in response to the correct CHID in the Remote K2 byte indicating that the request has been honoured. The bridging by Channel 1 is required to cause Channel 4 at site C to release its bridge thereby allowing the incoming traffic to reach Channel 1 via the P-loop.

Step 15: the mechanism used to cause Channel 4 to release its bridge is the changing of the local K2 byte by Channel 1.

Step 16: the new local K2 byte appears at the bottom channel at both sites A and C.

Step 17: Channel 4 at site C releases its switch reverting to the pass-through mode.

Steps 18-20: the new K2 byte, Local at site C and remote at site A, propagates up through the respective virtual loops. When both the remote and local K2 bytes carry the correct CHID, the protection switch is complete. This occurs a step 19 at site A and step 20 at site C.

Numerous modifications, variations and adaptations may be made to the particular embodiments of the invention described above without departing from the scope of the invention, which is defined in the claims.

What is claimed is:

1. In a SONET communications system comprising:
a first terminal at a first location; a second terminal at a second location remote from the first location; and a plurality of communications channels between the first and second terminals, each terminal having a plurality of shelves, which include a protection shelf and a plurality of working shelves, each working shelf within a terminal, being serially connected via a single protection loop from the protection shelf through the working shelves back to the protection shelf, a position for each working shelf within the terminal being defined by proximity to the protection shelf on the protection loop, each working shelf of the first terminal of a given position being connected to a respective working shelf of the second terminal via a respective one of the plurality of communications channels, each of which includes a forward channel for communication from the first terminal to the second terminal and a reverse channel for communication from the second terminal to the first terminal, the protection shelf of the first and second terminals being connected together via one of the plurality of communications channels that includes a forward protection channel and a reverse protection channel, a method comprising the steps of:
providing at each location, via the single protection loop, a local virtual protection loop for carrying an indication of protection requirements and status of the location local to the respective location; and
providing via the single protection loop at each location, a remote virtual protection loop for carrying an indication of protection requirements and status of the location remote from the respective location.

2. A method as claimed in claim 1 wherein the SONET communications system uses a frame format defined as 90 bytes by 9 bytes, including a transport overhead (TOH) of 3 bytes by 9 bytes, which is further subdivided into a section over (SOH) of by 3 bytes by 3 bytes and a line (LOH) of 3 bytes by 6, bytes in which protection bytes K1 and K2 are carried in STS-1 #1 by bytes five and six, and wherein the step of providing a local virtual protection loop includes the step of using the SOH byte five of STS-1 #25 and #2 to represent locally generated K1 and K2 bytes, respectively.

3. A method as claimed in claim 2 wherein the step of providing a local virtual protection loop at the first location includes the step of erasing locally generated K1 and K2 bytes prior to providing the traffic to the forward protection optical channel.

4. A method as claimed in claim 1 wherein the SONET communications system uses a frame format defined as 90 bytes including a transport overhead (TOH) of 3 bytes by 9 bytes, which is further subdivided into a section over (SOH) of by 3 bytes by 3 bytes and a line overhead (LOH) of 3 bytes by 6 bytes, in which protection bytes K1 and K2 are carried in STS-1 #1 by bytes five and six, and wherein at the first location the step of providing a remote virtual protection loop includes the step of copying K1 and K2 bytes received in STS-1 #1 on the reverse protection channel from the second location onto the SOH byte five of STS-1 #26 and #3, respectively.

5. A method as claimed in claim 4 wherein the step of copying K1 and K2 bytes is provided by the protection shelf prior to passing traffic onto the protection loop.

6. A method as claimed in claim 4 wherein the step of providing a remote virtual protection loop includes the step of erasing K1 and K2 bytes in SOH byte five of STS-1 #26 and 3, respectively, prior to providing the traffic to an outgoing optical channel.

7. In a SONET communications system comprising:
a first terminal at a first location;
a second terminal at a second location remote from the first location; and
a plurality of communications channels between the first and second terminals;
each terminal having a plurality of shelves, which include a protection shelf and a plurality of working shelves, each working shelf within a terminal, being serially connected via a single protection loop from the protection shelf through the working shelves back to the protection shelf, a position for each working shelf within the terminal being defined by proximity to the protection shelf on the protection loop;

each working shelf of the first terminal of a given position being connected to a respective working shelf of the second terminal via a respective one of the plurality of communications channels, each of which includes a forward channel for communication from the first terminal to the second terminal and a reverse channel for communication from the second terminal to the first terminal; and the protection shelf of the first and second terminals being connected together via one of the plurality of communications channels that includes a forward protection channel and a reverse protection channel.

8. A communications system as claimed in claim 7 wherein the protection loop is coupled through each working shelf via a receiver and a transmitter.

9. A communications system as claimed in claim 8 wherein the protection loop provides two virtual protection loops, at each location, one for carrying K1 and K2 bytes indicative of the protection requirements of the first location and one for carrying K1 and K2 bytes indicative of the protection requirements of the second location.

10. A communications system as claimed in claim 9 wherein the local protection loop is provided by inserting K1 and K2 bytes into SOH byte five of STS-1 #25 and #2, respectively.

11. A communications system as claimed in claim 9 wherein the remote protection loop is provided by inserting K1 and K2 bytes into SOH byte five of STS-1 #26 and #3, respectively.

* * * * *